Feb. 7, 1928.                                                    1,658,625
H. W. AINSWORTH ET AL
ATTACHMENT FOR BULK CONTAINERS FOR INDICATING LEVEL
OF LIQUID CONTENTS THEREIN
Filed April 8, 1927
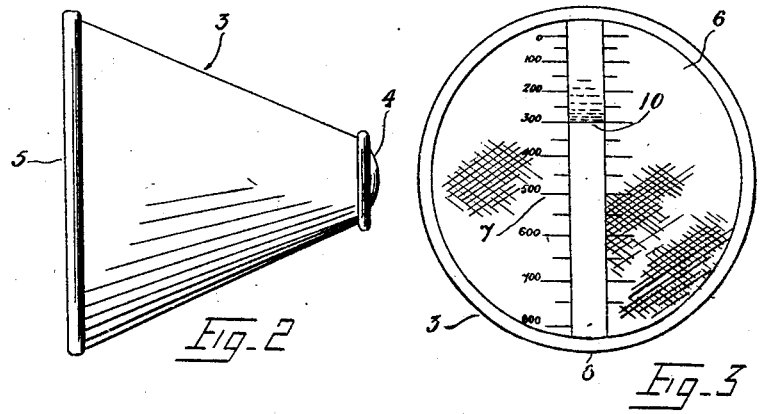
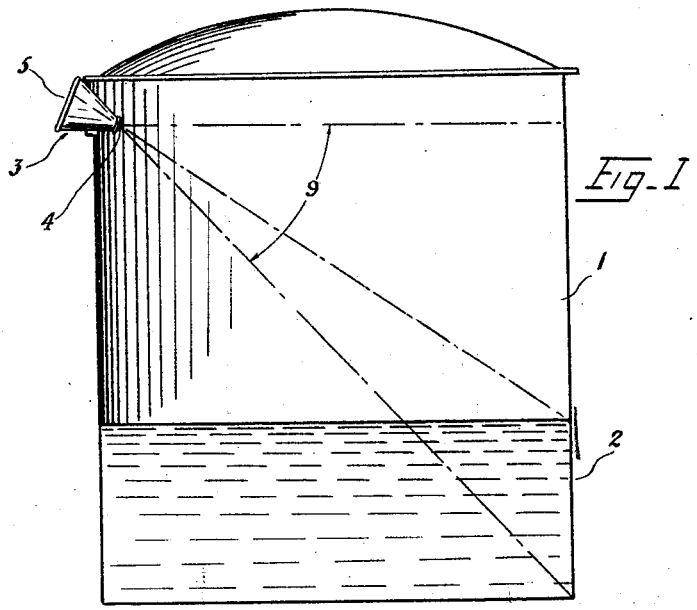
Harry Whitfield Ainsworth
Alva Charles Likely
Leslie Boardman
INVENTORS
By Otto Munk
their Attorney.

Patented Feb. 7, 1928.

1,658,625

UNITED STATES PATENT OFFICE.

HARRY WHITFIELD AINSWORTH, OF CROYDON, ALVA CHARLES LIKELY, OF GREENWICH, AND LESLIE BOARDMAN, OF VAUCLUSE, NEW SOUTH WALES, AUSTRALIA.

ATTACHMENT FOR BULK CONTAINERS FOR INDICATING LEVEL OF LIQUID CONTENTS THEREIN.

Application filed April 8, 1927, Serial No. 181,971 and in Australia February 2, 1927.

This invention consists in an attachment for bulk petrol waggons, railway waggons, milk vats, and other such containers for offering an immediate indication at any time on a marked scale of the volume of liquid contained in said containers. The invention consists essentially in a tube or other closed carrier fitted at one end of it with a wide angle condenser lens and at the other end of it with a ground glass or similar screen having a graduated measure scale inscribed on it. The device is fixed firmly on the top part or on the upper part of one side of the container so that the whole height of the distant interior side of the container is within the field of the lens. The liquid level is therefore observable on the ground glass screen, the position of the liquid surface level on the container wall being projected as an "image" onto the screen so that it may read off against the graduated marking which is calibrated in the first instance when the device was fitted to the container to indicate the volume of the contents at every necessary interval of height. An immediate sighting observation may thus be obtained, whereby a carrier or storeman or checker may at any time ascertain the volume retained in the container without calculation or proving.

In the accompanying drawings:—

Figure 1 is a semi-diagrammatic sectional view of a container for liquids fitted with the device;

Fig. 2 is a side elevational view of the attachment; and

Fig. 3 is a frontal elevation thereof.

The container 1 may be a barrel, tank or vat. The interior surface of one wall of it should be finished so as to present a color contrast with the color of the liquid 2 which is stored in the container; this contrast may be obtained by fitting a strip of metal or other material vertically against the wall of the container, said strip being finished to an appropriate color so that the surface line of the liquid 2 will be clearly observable as a line across it. 3 is a conical or other casing fitted at one end of it with a condenser lens 4 such as is used in a photographic camera and having the other end of it 5 fitted with a cover disc 6 marked with a vertical scale 7, the figuring on this scale corresponding with the volume contents of the container 1. The disc 6 has a translucent vertical strip 8 inserted in it, this strip being of ground glass or celluloid. The lens should be wide angle so as to embrace the field 9 covering the whole height of the wall of the container opposite the casing 3. The level of the liquid 2 in the container is observable on the screen 8 as shown at 10, Fig. 3, and may be directly read off the scale.

What we claim as our invention and desire to secure by Letters Patent is:—

A sight attachment for measuring the contents of a container, comprising a carrier arranged in the wall of the container, a translucent screen at one end of the carrier, said screen being provided with a calibrated scale and a lens at the other end of the carrier so relatively positioned with respect to the screen and container as to be focussed on the said scale and to embrace in its field one interior side of the container, whereby the image of the level of the contents will be visible on the screen at a line on the scale corresponding to a line where the surface of the container's contents crosses the container's side.

In testimony whereof we affix our signatures.

HARRY WHITFIELD AINSWORTH.
ALVA CHARLES LIKELY.
LESLIE BOARDMAN.